United States Patent
Matsumaru et al.

(10) Patent No.: US 9,529,305 B2
(45) Date of Patent: Dec. 27, 2016

(54) DEVELOPER CONTAINER, DEVELOPMENT DEVICE, PROCESS CARTRIDGE, AND IMAGE FORMING APPARATUS

(71) Applicant: CANON KABUSHIKI KAISHA, Tokyo (JP)

(72) Inventors: Naoki Matsumaru, Numazu (JP); Akira Suzuki, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/326,202

(22) Filed: Jul. 8, 2014

(65) Prior Publication Data
US 2015/0016830 A1    Jan. 15, 2015

(30) Foreign Application Priority Data

Jul. 12, 2013 (JP) ................................ 2013-146569
Jun. 18, 2014 (JP) ................................ 2014-125611

(51) Int. Cl.
G03G 15/08   (2006.01)

(52) U.S. Cl.
CPC ........ *G03G 15/0896* (2013.01); *G03G 15/086* (2013.01)

(58) Field of Classification Search
CPC .............. G03G 15/0831; G03G 15/086; G03G 2215/0888; G03G 21/1875; G03G 21/1867; B29C 70/88; B29C 70/78; B29C 2045/14122
See application file for complete search history.

(56) References Cited

U.S. PATENT DOCUMENTS

| | | | | |
|---|---|---|---|---|
| 6,591,070 B1 * | 7/2003 | Shoji | ................. | G03G 15/0856 399/119 |
| 2002/0025174 A1 | 2/2002 | Sakurai et al. | | |
| 2002/0191981 A1 * | 12/2002 | Miyabe | ............ | B29C 45/14467 399/90 |
| 2003/0016955 A1 * | 1/2003 | Hiratsuka | .......... | G03G 15/0803 399/27 |

(Continued)

FOREIGN PATENT DOCUMENTS

| | | |
|---|---|---|
| EP | 0665475 A2 | 8/1995 |
| JP | H02-283413 A | 11/1990 |

(Continued)

OTHER PUBLICATIONS

JP_2000356246_A_T Machine Translation, Ebizuka, Japan, Jun. 1999.*

*Primary Examiner* — Minh Phan
*Assistant Examiner* — Victor Verbitsky
(74) *Attorney, Agent, or Firm* — Canon USA, Inc. IP Division

(57) ABSTRACT

A developer container includes a conductive member containing a resin configured to detect a developer amount using capacitance, and a frame member having the conductive member configured to store the developer. The conductive member is provided on a first side of the frame member contacting the developer and on a second side of the frame member, the second side is the back of the first side, and the conductive member provided on the first side and the conductive member provided on the second side are connected with each other within the frame member.

36 Claims, 25 Drawing Sheets

(56) References Cited

U.S. PATENT DOCUMENTS

2003/0161644 A1* 8/2003 Yokoi ................ G03G 21/1832
399/27
2005/0127564 A1* 6/2005 Van Der Aa ...... B29C 45/14221
264/266
2012/0238149 A1* 9/2012 Tate .................. B29C 45/14065
439/660

FOREIGN PATENT DOCUMENTS

| JP | H08-015975 A | 1/1996 |
| JP | 2000-250380 A | 9/2000 |
| JP | 2000356246 A * | 12/2000 |
| JP | 2003-248371 A | 9/2003 |
| JP | 2003-323036 A | 11/2003 |
| JP | 2012-168241 A | 9/2012 |
| WO | 2011/038703 A1 | 4/2011 |

* cited by examiner

DEVELOPER CONTAINER, DEVELOPMENT DEVICE, PROCESS CARTRIDGE, AND IMAGE FORMING APPARATUS

BACKGROUND OF THE INVENTION

Field of the Invention

The present invention relates to a developer container, a development device, a process cartridge, and an image forming apparatus.

A development device includes a developer bearing member, and the device is used to visualize an electrostatic latent image with developer. A process cartridge includes an image bearing member for bearing the developer image and a process unit acting on the image bearing member. The image bearing member and the process unit are integrated as a cartridge.

Description of the Related Art

In electrophotographic image forming apparatuses using electrophotographic imaging process, a process cartridge method has been employed. In the process cartridge method, an electrophotographic photosensitive member and a process unit acting thereon are combined into one cartridge to provide the cartridge detachable from the electrophotographic image forming apparatus body.

Such a process cartridge method enables users to perform maintenance of the apparatuses by themselves without relying on service staff, and this significantly increases the apparatus operability. For this reason, the process cartridge method has been widely used in the electrophotographic image forming apparatuses.

Process cartridges include toner, to provide the color, and developer, which consists of magnetic particles that carry the color on an outside of a magnetic developer drum. The developer allows a latent electrostatic image on the photoconductor to take up sufficient toner to give a properly colored image. In the electrophotographic image forming apparatuses employing the process cartridge method as described above, the users can replace the process cartridges by themselves. Consequently, the electrophotographic image forming apparatuses are often provided with a means for detecting toner consumption amount and notifying the users of the timing of replacement, that is, a toner remaining amount detection unit. Toner consumption amount can be based on electrical resistance properties since electrical resistance properties will change depending on the developer-toner mix.

As examples of the remaining toner amount detection unit, Japanese Patent Application Laid-Open No. 2003-248371 and Japanese Patent Application Laid-Open No. 2012-168241 discuss systems for detecting change in capacitance between a plurality of electrodes disposed in a process cartridge, and notifying a remaining toner amount. In the system in Japanese Patent Application Laid-Open No. 2003-248371, a developer bearing member is used as an input side electrode, and a capacitance detection member is used as an output side electrode. The capacitance detection member is disposed to face the developer bearing member in the development device, and capacitance is detected by applying an alternating current bias to the developer bearing member. In this structure, the process cartridge is provided with a contact member for electrically connecting the capacitance detection member and a conductive member (hereinafter, referred to as a body side remaining toner amount contact) having spring properties, the conductive member being provided in the image forming apparatus body. The application of the AC bias to the developer bearing member induces an electric current corresponding to the capacitance (remaining toner amount) between the developer bearing member and the capacitance detection member. The current value is measured, through the contact member provided at the process cartridge side, and the body side toner remaining contact, by the remaining toner amount detection unit of the image forming apparatus body and thereby the remaining toner amount can be sequentially detected.

SUMMARY OF THE INVENTION

The present invention has been made by further improving the above-described techniques, and provides a simple structure for capacitance detection provided, for example, in a process cartridge.

According to an aspect of the present invention, a developer container includes a conductive member containing a resin, the conductive member being configured to detect a developer amount using capacitance, and a frame member having the conductive member configured to store the developer. The conductive member is provided on a first side of the frame member contacting the developer and on a second side of the frame member, the second side is the back of the first side, and the conductive member provided on the first side and the conductive member provided on the second side are connected with each other within the frame member.

According to another aspect of the present invention, a developer container includes a conductive member containing a resin, the conductive member being configured to detect a developer amount using capacitance, and a frame member having the conductive member configured to store the developer. The frame member includes a curved surface or a bent portion, and the conductive member is provided on the curved surface or the bent portion. Further, a development device, a process cartridge, and an image forming apparatus are provided.

As described above, according to the exemplary embodiments of the present invention, a developer container and a process cartridge having simple structures to detect capacitance can be provided.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Hereinafter, the first exemplary embodiment of the present invention is described in detail with reference to the attached drawings.

Figure 1:
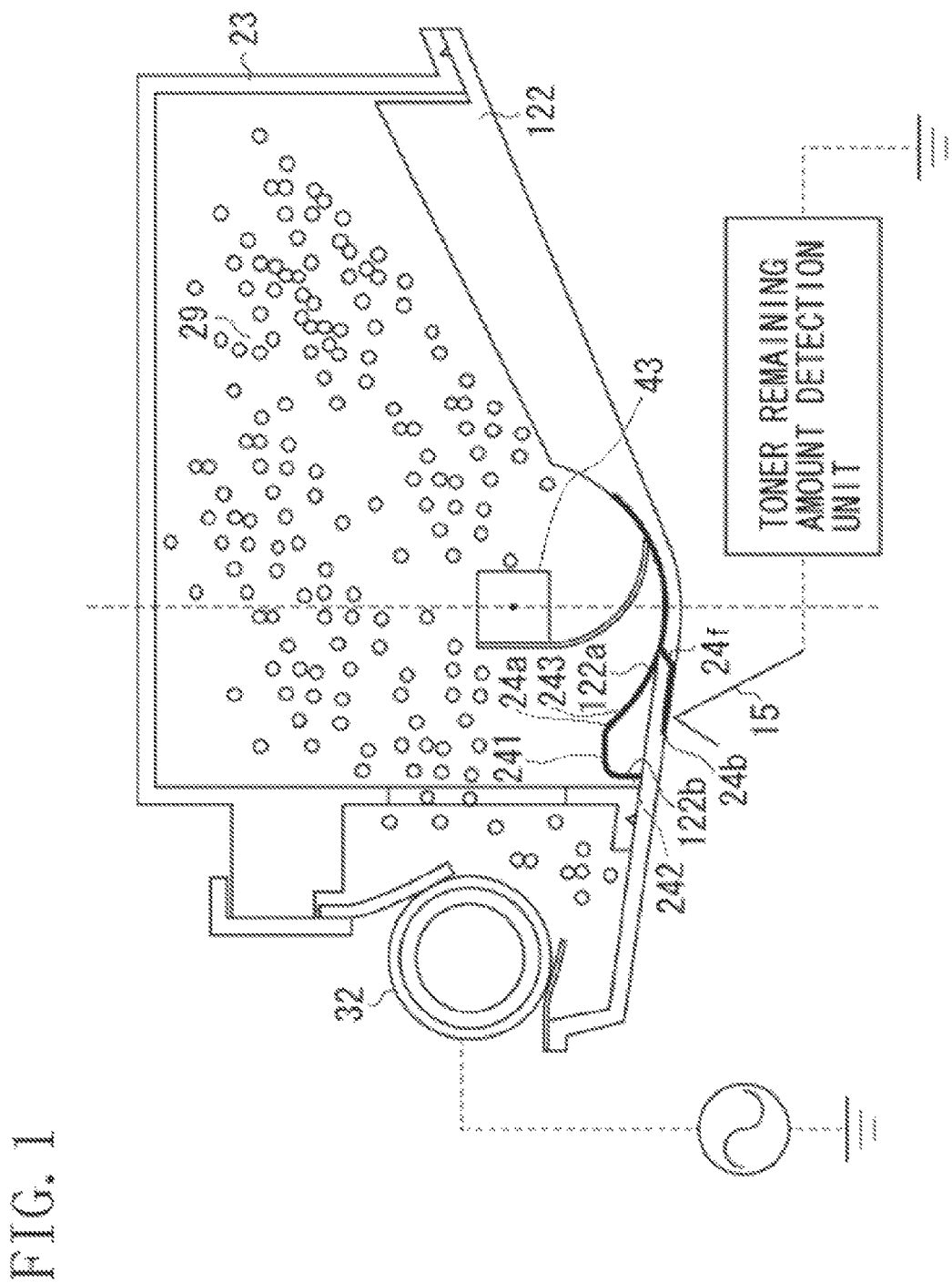
FIG. 1 is a cross-sectional view illustrating a development device unit.

FIG. 1 is a cross-sectional view illustrating a development device unit having a development roller 32. The development roller 32 is part of a process unit acting on an electrophotographic photosensitive drum 62 (FIG. 3) serving as an image bearing member 62. The drum 62 is rotated in the arrow R direction. A rotational axis direction of the drum 62 is the longitudinal direction. A driven shaft 14 (FIG. 4) engages with a driving force reception unit to provide driving force to the drum 62. In the longitudinal direction, the side where the electrographic photosensitive drum 62 receives the driving force from an image forming apparatus body A (FIG. 2) is defined as a driven side, and the other side is defined as a non-driven side.

Figure 2:
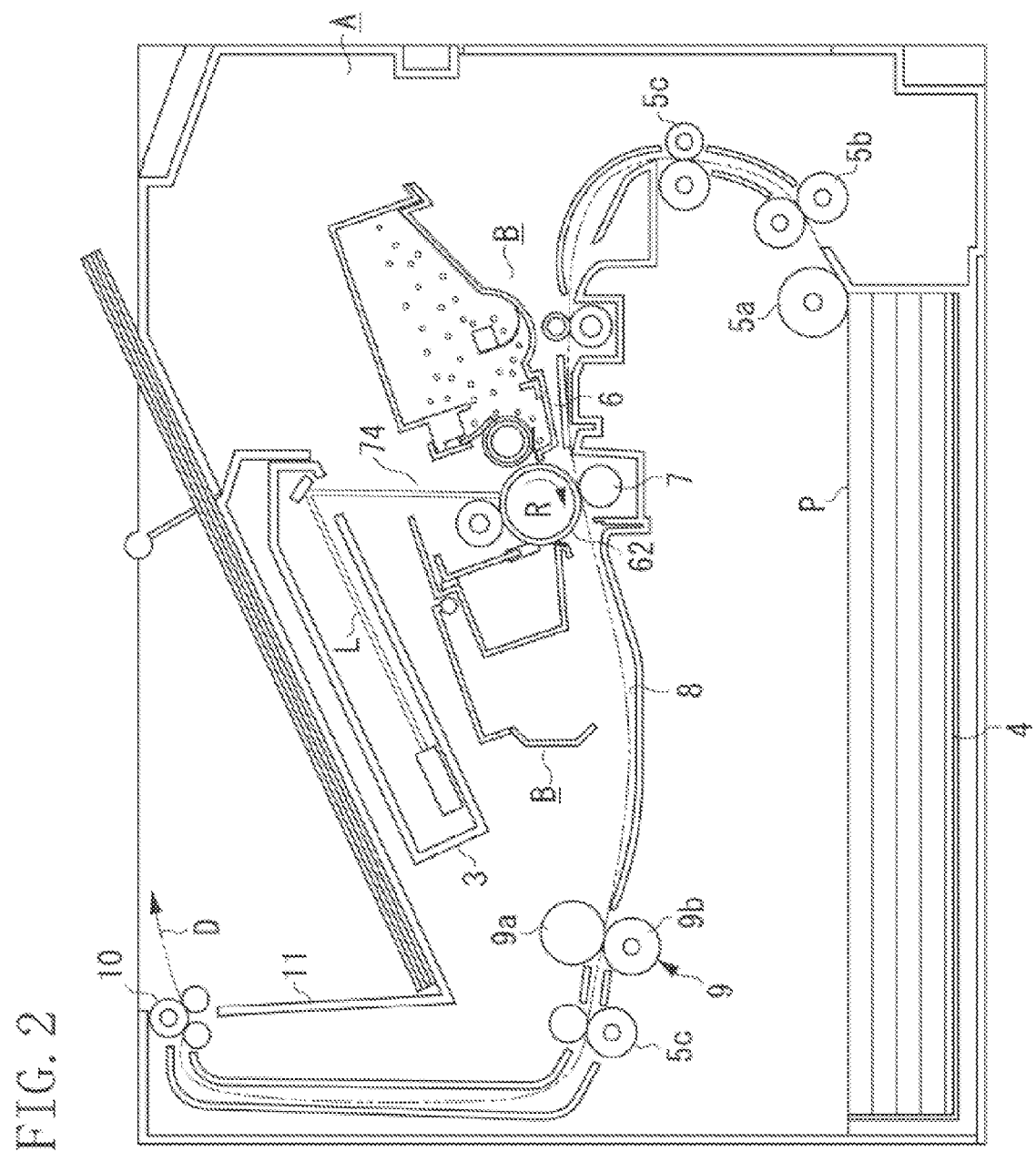
FIG. 2 is a cross-sectional view illustrating an image forming apparatus according to the first exemplary embodiment.
Figure 3:
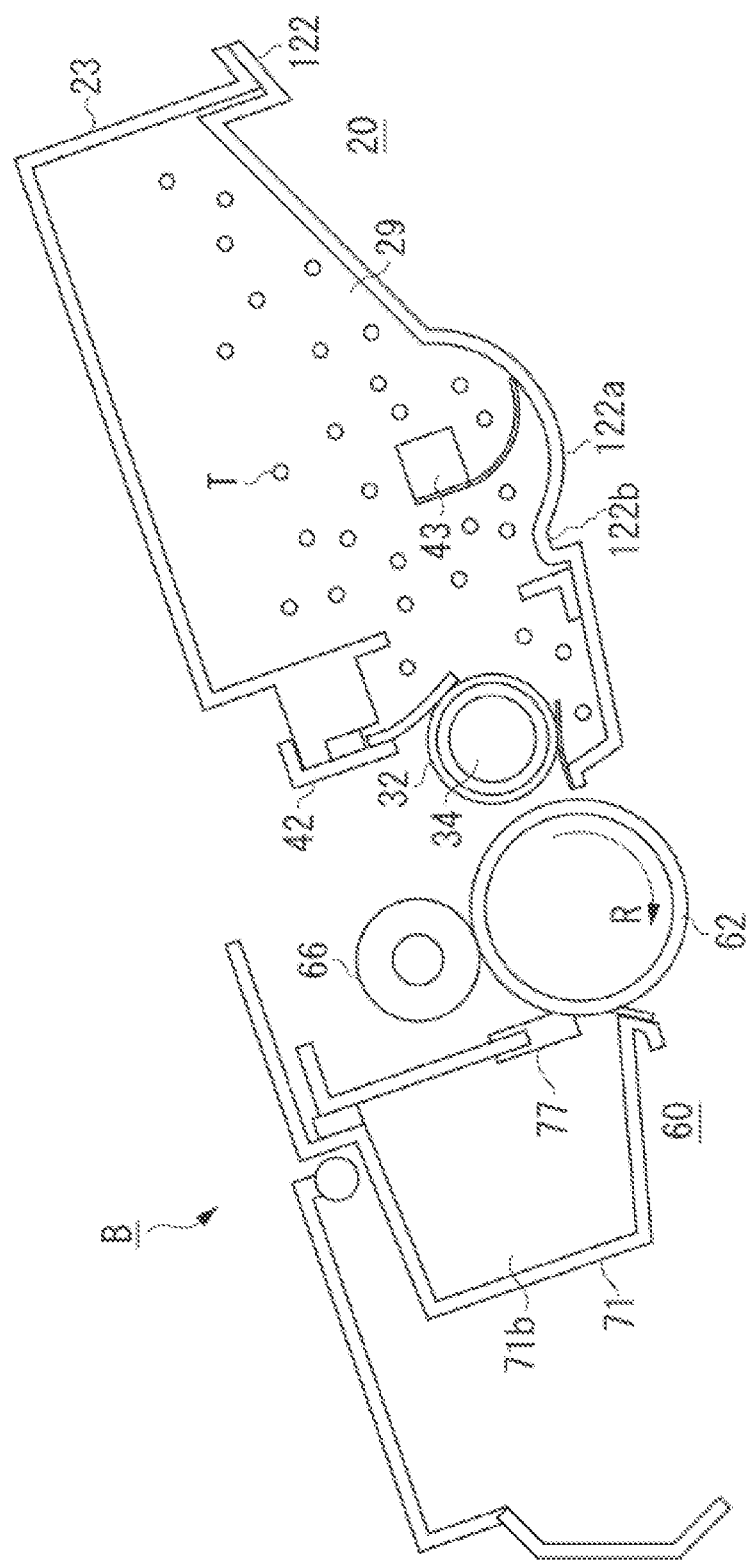
FIG. 3 is a cross-sectional view illustrating a process cartridge according to the first exemplary embodiment.

With reference to FIGS. 2 and 3, the overall image forming structure and an image forming process are described.

FIG. 2 is a cross-sectional view illustrating the image forming apparatus body A (hereinafter, referred to as the apparatus body A) of an electrophotographic image forming apparatus and a process cartridge B (hereinafter, referred to as a cartridge B) according to the exemplary embodiment of the present invention. FIG. 3 is a cross-sectional view of the cartridge B.

The apparatus body A of the electrophotographic image forming apparatus is an electrophotographic image forming apparatus portion except for the cartridge B.

(Overall Structure of the Image Forming Apparatus)

In FIG. 2, the electrophotographic image forming apparatus is a laser beam printer employing an electrophotographic technique enabling attachment of the cartridge B to the apparatus body A and detachment of the cartridge B from the apparatus body A. In a state where the cartridge B is set to the apparatus body A, an exposure device 3 (laser scanner unit 3) is disposed over the cartridge B.

Below the cartridge B, a sheet tray 4 that stores a recording medium P (hereinafter, referred to as a sheet material P) such as paper on which an image is formed is disposed.

Further, the apparatus body A includes serially, along the conveyance direction D of the sheet material P, a pickup roller 5a, a sheet feeding roller pair 5b, a conveyance roller pair 5c, a transfer guide 6, a transfer roller 7, a conveyance guide 8, a fixing device 9, a discharge roller pair 10, and a discharge tray 11 in this order. The fixing device 9 includes a heating roller 9a and a pressure roller 9b.

(Image Forming Process)

The image forming process is briefly described. In response to a print start signal, the electrophotographic photosensitive drum 62 (hereinafter, referred to as a drum 62) serving as an image bearing member 62 is rotated to drive at a predetermined circumferential velocity (process speed) in the arrow R direction.

A charging roller 66 (FIG. 3) serving as a charging means to which a bias voltage is applied contacts the outer circumferential surface of the drum 62 to uniformly charge the outer circumferential surface of the drum 62. The exposure device 3 outputs a laser beam L according to image information. The laser beam L passes through an exposure window portion 74 of the top surface of the cartridge B to scan and expose the outer circumferential surface of the drum 62. Thus, an electrostatic latent image corresponding to the image information is formed on the outer circumferential surface of the drum 62.

Meanwhile, as illustrated in FIG. 3, in a development device unit 20 (developer container 20) of the cartridge B, toner T in a toner storage portion 29 is stirred and conveyed by the rotation of a conveyance member 43.

The toner T is carried onto the surface of a development roller 32 by the magnetic force of a magnet roller (stationary magnet) 34. The thickness of the toner layer on the circumferential surface of the development roller 32 is controlled by a development blade 42 serving as a developer layer thickness regulation member while being friction-charged.

The toner T is transferred corresponding to the electrostatic latent image to the drum 62, and visualized as a toner image (developer image).

As illustrated in FIG. 2, at the timing of output of the laser beam L, the pickup roller 5a, the sheet feeding roller pair 5b, and the conveyance roller pair 5c feed the sheet material P stored in the lower part of the apparatus body A from the sheet tray 4.

The sheet material P is conveyed via the transfer guide 6 to a transfer position between the drum 62 and the transfer roller 7. At the transfer position, the toner image is sequentially transferred from the drum 62 onto the sheet material P.

The sheet material P on which the toner image has been transferred is separated from the drum 62 and conveyed to the fixing device 9 along the conveyance guide 8. Then, the sheet material P passes through the nip portion of the heating roller 9a and the pressure roller 9b of the fixing device 9.

At the nip portion, heating-fixing processing is performed and the toner image is fixed onto the sheet material P. The sheet material P onto which the toner image fixation process has been made is conveyed to a discharge roller pair 10, and discharged onto a discharge tray 11.

Meanwhile, as illustrated in FIG. 3, the toner remaining on the outer circumferential surface of the transfer-processed drum 62 is removed by a cleaning blade 77. The drum 62 is used again in the image forming process. The toner removed from the drum 62 is stored in a waste toner chamber 71b in a cleaning unit 60.

In this exemplary embodiment, the charging roller 66 serving as a charging unit 66, the development roller 32 serving as a developer bearing member 32/development unit 32, and the cleaning blade 77 serving as a blade cleaning unit 77 constitute a process unit acting on the drum 62. The process unit may include at least one of the charging unit 66, the development unit 32, and the blade cleaning unit 77.

(Attachment and Detachment Structure of the Cartridge B)

Figure 4:
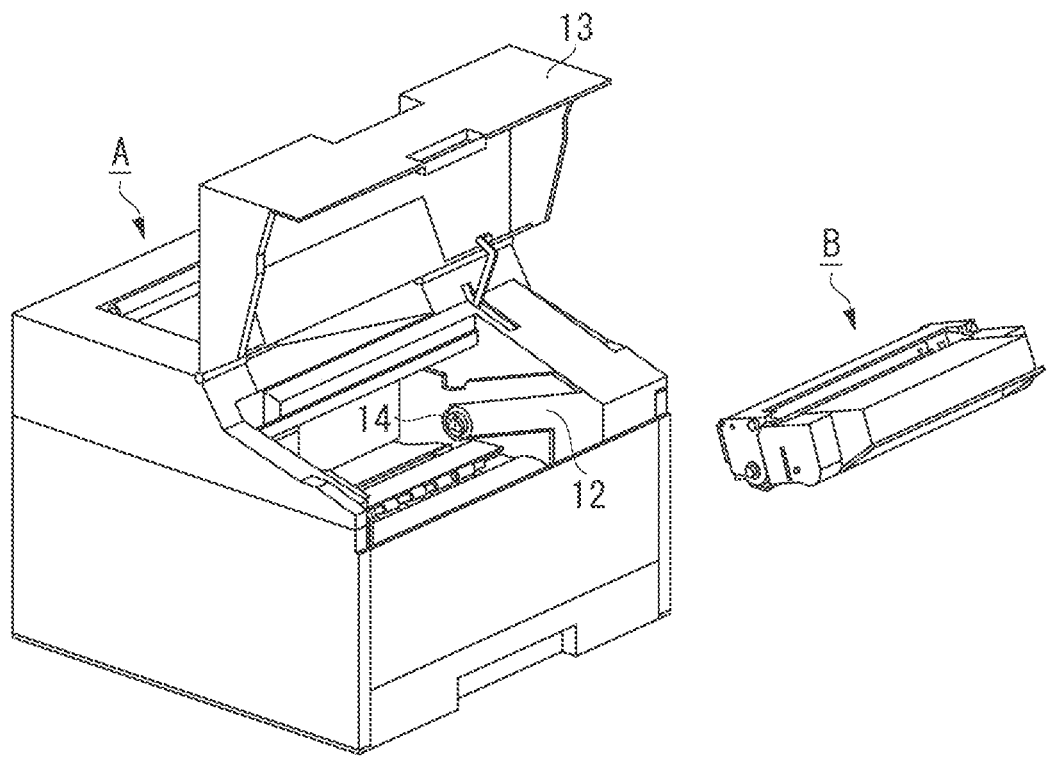
FIG. 4 is a perspective view illustrating the image forming apparatus body with an opened opening/closing door and the process cartridge according to the first exemplary embodiment.

With reference to FIG. 4, the attachment/detachment of the cartridge B to/from the apparatus body A is described.

FIG. 4 is a perspective view of the apparatus body A with an opening/closing door 13 opened for attachment or detachment of the cartridge B, and the cartridge B.

The opening/closing door 13 is rotatably mounted to the apparatus body A. When the opening/closing door 13 is opened, a guide rail 12 provided within the apparatus body A appears, and the cartridge B is installed into the apparatus body A along the guide rail 12.

A driven shaft 14 to be driven by a motor (not illustrated) of the apparatus body A engages with a driving force reception unit provided in the cartridge B.

With this structure, the drum 62 engaging with the driving force reception unit receives the driving force from the apparatus body A and rotates.

(Overall Structure of the Cartridge B)

Figure 5:
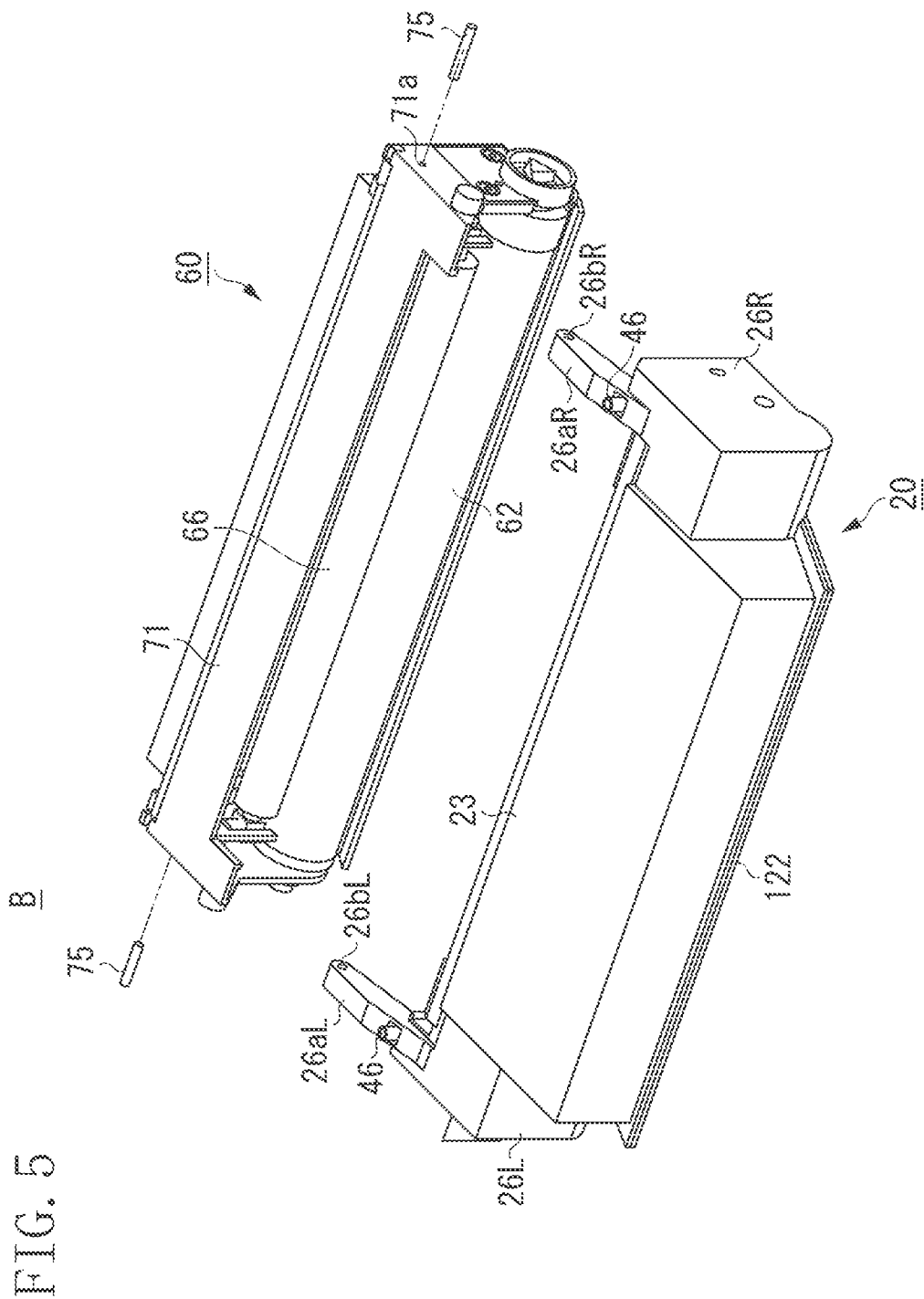
FIG. 5 is a perspective view illustrating a structure of the process cartridge according to the first exemplary embodiment.

With reference to FIGS. 3 and 5, an overall structure of the cartridge B is described.

FIG. 5 is a perspective view illustrating a structure of the cartridge B.

The cartridge B is formed by integrating the cleaning unit 60 and the development device unit 20.

The cleaning unit 60 includes a cleaning frame member 71, the drum 62, the charging roller 66, and the cleaning blade 77.

The development device unit 20 includes a cover member 122 (FIGS. 1, 5-6, and 12), a toner storage container 23 (FIG. 3), a first side member 26L, a second side member 26R, the development blade 42, the development roller 32, the magnet roller 34, the conveyance member 43 (stirring member 43), the developer/toner T, and an urging member 46.

The cartridge B is formed by rotatably connecting the cleaning unit 60 with the development device unit 20 by connection members 75.

Specifically, rotation holes 26bL and 26bR are provided in parallel with the development roller 32 at distal end portions of arm units 26aL and 26aR formed in the first side member 26L and the second side member 26R at both end portions of the development device unit 20 in the longitudinal direction.

At the both end portions of the cleaning frame member 71 in the longitudinal direction, fitting holes 71a for the connection members 75 to fit into are formed.

The arm units 26aL and 26aR are positioned at predetermined positions on the cleaning frame member 71, and the connection members 75 are inserted into the rotation holes 26bL and 26bR and the fitting holes 71a. With this structure, the cleaning unit 60 and the development device unit 20 are rotatably connected around the connection members 75, and thereby the process cartridge B is formed.

In this structure, the urging members 46 attached at the bottom/proximal end of the arm unit 26aL and 26aR contact the cleaning frame member 71, and urge the development device unit 20 against the cleaning unit 60 around the connection members 75 serving as the rotation center. With this structure, the development roller 32 is surely pressed in the direction toward the drum 62.

(Development Device Unit)

Figure 6:
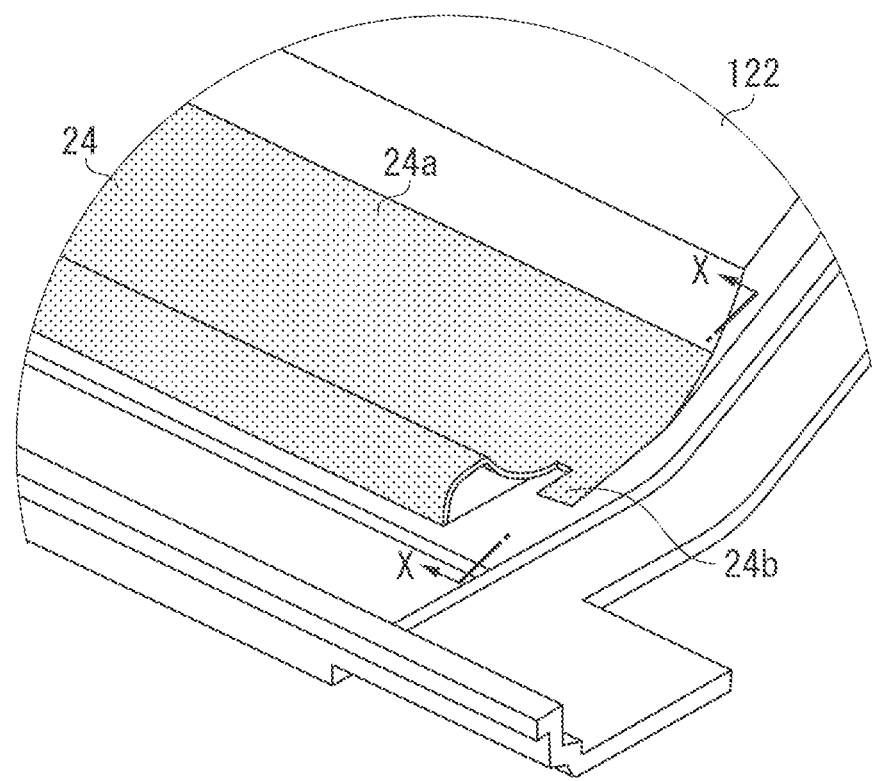
FIG. 6 is a partial perspective view of a member formed by a conductive sheet serving as the remaining toner amount detection member to constitute a cover member serving as a first frame member.

With reference to FIG. 1 and FIGS. 6 to 12, a structure of the development device unit 20 according to the exemplary embodiment of the present invention is described. FIG. 6 is a partial perspective view of a member formed by integrating a conductive sheet 24, which is a conductive member 24 serving as a remaining toner amount detection member 24, with the cover member 122 serving as a first frame member 122.

As illustrated in FIG. 1 and FIG. 6, the conductive sheet 24, which is a conductive member 24, has two functional portions. One portion is a remaining toner amount detection portion 24a to be used to detect a developer amount of developer/toner T. The other portion is a contact portion 24b to be used to electrically connect to an external part such as the apparatus body A. A part of the conductive member 24 functions as the remaining toner amount detection portion 24a, and the other part of the conductive member 24 functions as the contact portion 24b to be electrically connected to an external part. The entire conductive sheet 24, which is the conductive member 24, is integrated with the cover member 122. In this exemplary embodiment, the contact portion 24b is a portion exposed to the outer surface of the cover member 122. The surface area of the contact portion 24b is an area being exposed to the outer surface.

Figure 20:
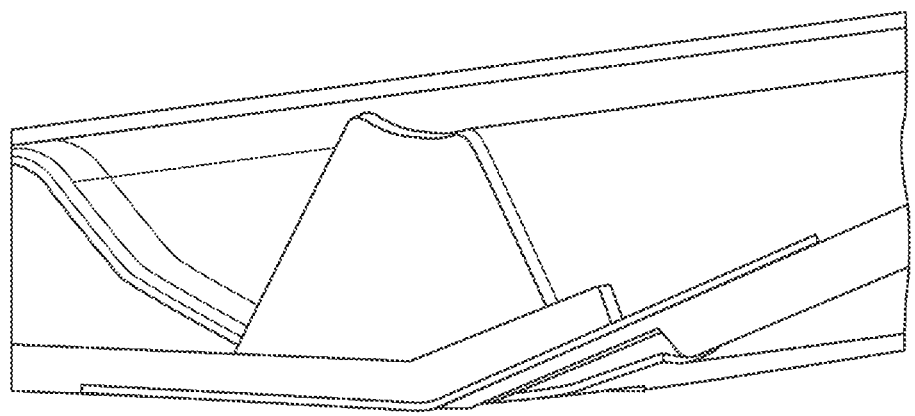
FIG. 20 is a cross-sectional view illustrating the conductive sheet according to the first exemplary embodiment.

As illustrated in FIG. 1, the conductive member 24 is formed on a curved surface portion 122a and a bent portion 122b of the cover member 122, which is the first frame member 122. This is because a conductive member resin 24d (FIGS. 8a to 8c) contained in the conductive member 24 makes the shape of the conductive member 24 flexible. As will be understood from FIG. 1, the conductive sheet 24 is formed starting from the curved surface of the curved surface portion 122a, which connects to a plane portion, and advancing from the plane, via the bent portion 122b (FIG. 3), along the wall surface formed in the direction of gravity, to constitute the conductive member 24. When viewed along the rotation shaft of the development roller 32 (cross section), the conductive sheet 24 is disposed across the rotation shaft of the stirring member 43. This is because the conductive sheet 24 is provided in the wide area to detect a remaining toner amount in a wide area. A joint portion 24f connecting the remaining toner amount detection portion 24a and the contact portion 24b that are parts of the conductive sheet 24 is formed from the curved surface portion 122a of the inner surface of the frame member toward the outside surface. From a manufacturing point of view, as compared to the method of forming the joint portion 24f of the conductive member 24 from the curved surface portion 122a as illustrated in FIG. 1, it is easier to form the joint portion 24f of the conductive member 24 on the straight plane as illustrated in FIG. 20. In such a case, it is easier to manufacture the joint portion 24f if the plane of the conductive sheet 24, more distant from the development roller 32 than the rotation shaft of the stirring member 43 in FIG. 1, is also flat since the plane is continuously flat.

More specifically, in this structure, the bent portion 122b is an area including the top of the convex portion projecting toward the development roller 32. The curved surface portion 122a and the bent portion 122b constitute a part of the convex portion projecting from the cover member 122. As will be understood from FIG. 6, the convex portion extends in the same direction as the longitudinal direction of the conductive sheet 24. In FIG. 1, the convex portion is in the storage chamber 29 storing the toner T, and the convex portion is connected to the development chamber having the development roller 32 via an opening. In the cross section viewed along the rotation shaft of the stirring member 43, a development sleeve of the development roller 32, the opening, the convex portion, and the rotation shaft of the stirring member 43 are disposed in this order in the horizontal direction. As will be understood from FIG. 1, the convex portion includes a peak portion 241, a first side portion 242 which is lower than the peak portion 241 in a direction of gravity in an attitude at time of use and arranged at the side the developer bearing member 32 exists, and a second side portion 243 which is lower than the peak portion 241 in the direction of gravity in the attitude at time of use and arranged at the side the conveyance member 43 exists. The first side portion 242 is covered with the detection portion 24a.

Meanwhile, as illustrated in FIGS. 1 and 6, one conductive sheet 24 can be used as an electrode for detecting capacitance. Alternatively, a plurality of conductive sheets 24 can be disposed. For example, in FIG. 1, one conductive sheet 24 is formed on the bent portion 122b, and another conductive sheet 24 can be provided at a position more distant from the development roller 32 than the rotation shaft of the stirring member 43. In such a case, the contact points can be separately formed. Forming the conductive sheet 24 on the bent portion 122b enables detection of a change in the toner amount near the development roller 32 as an electrical signal. Consequently, when the remaining toner amount becomes low, the remaining toner amount can be correctly detected. The conductive sheet 24 provided at the position more distant from the development roller 32 than the rotation shaft of the stirring member 43 is used to detect a rough remaining toner amount. With the plurality of conductive sheets 24, the remaining amount can be more correctly detected by comparing the electrical signals such as voltage detected from the electrodes and obtaining the difference.

Hereinafter, a method of manufacturing the developer container 20 is described. Important factors in manufacturing the developer container 20 include integrated molding (in this exemplary embodiment, sheet molding) of the conductive sheet 24 and the cover member 122. In this exemplary embodiment, prior to the description of the integrated molding of the conductive sheet 24 to the cover member 122, first, an integrated molding method for the remaining toner amount detection portion 24a is described with reference to FIGS. 7 and 9. Then, an integrated molding method for the contact portion 24b according to the exemplary embodiment of the present invention is described with reference to FIGS. 10 and 11.

FIGS. 7A to 7E are conceptual views illustrating a mold structure 35 used in this exemplary embodiment. In this exemplary embodiment, a fine air hole is provided in an area S of the mold 35 of a fixed side. The fine air hole is connected to a suction device (not illustrated) to fix the conductive sheet 24 to the mold 35 at the fixed side.

Figure 7A:
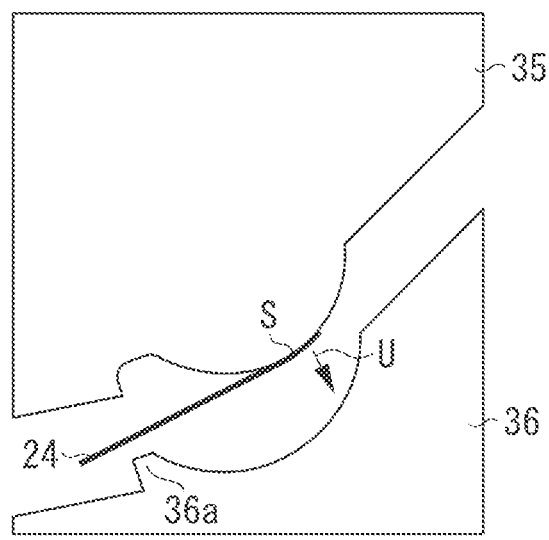
FIGS. 7A to 7E are conceptual views of a mold structure according to the first exemplary embodiment.
Figure 7B:
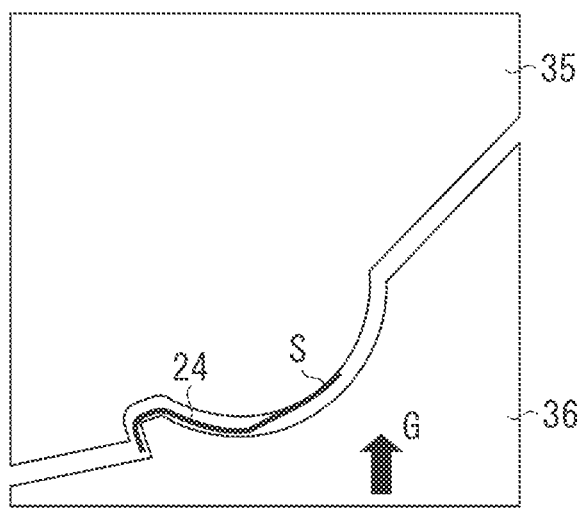

When the conductive sheet 24 is sucked and held in the mold 35 at the fixed side, a movable side 36 of the mold 35 moves in the G direction and becomes the state shown in FIG. 7B.

Figure 7C:
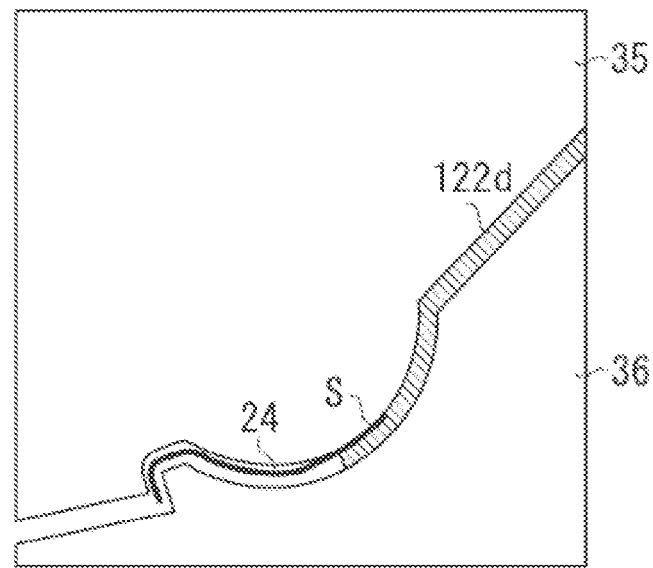
Figure 7D:
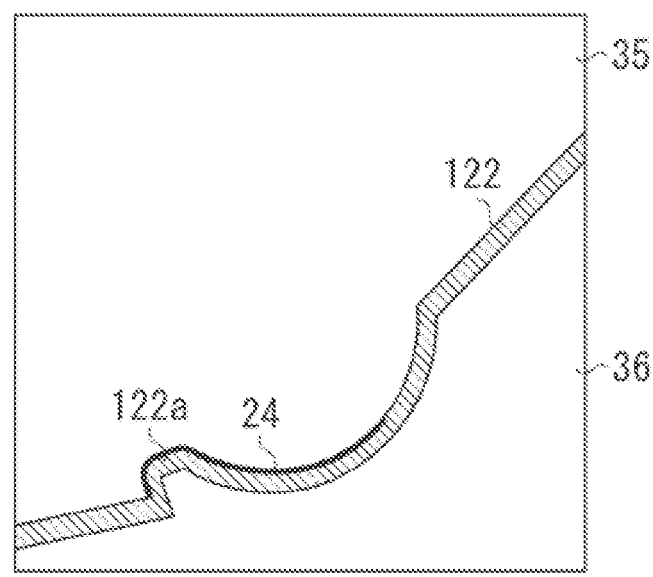
Figure 7E:
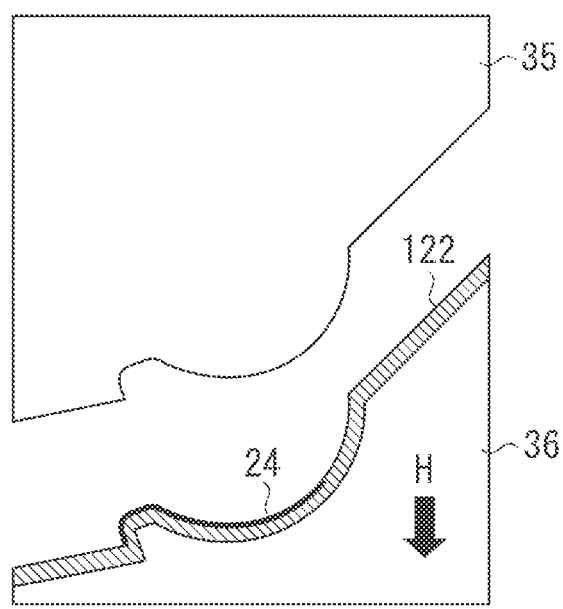

Then, a cover member resin 122d, which is a material for the cover member 122, is injected (the shaded area in FIG. 7C) from a gate portion (not illustrated). As illustrated in FIGS. 7C to 7D, by the injection pressure of the cover member resin 122d, the surface of the conductive sheet 24 is molded in the shape of the mold 35 of the fixed side. When the injection of the cover member resin 122d is completed (FIG. 7D), the cover member 122 is formed the suction of the conductive sheet 24 by the mold 35 of the fixed side is stopped. Then, the movable side 36 of the mold 35 opens in the H direction (FIG. 7E), and the integrated molding of the conductive sheet 24 to the cover member 122 is completed (FIG. 7E).

In this exemplary embodiment, the conductive sheet 24 is held and fixed to the fixed side in the mold 35. This is because after the completion of the injection of the cover member resin 122d, while the movable side 36 of the mold 35 is open (FIG. 7E), the next conductive sheet 24 can be set (held and fixed) to the fixed side of the mold 35 to shorten the molding cycle. Consequently, it is not always necessary to fix the conductive sheet 24 to the fixed side of the mold 35, and the conductive sheet 24 can be fixed to the movable side 36 of the mold 35.

In the below exemplary embodiment, the conductive sheet 24 is formed by the integrated molding. Alternatively, the conductive sheet 24 can be formed, for example, by gluing resins together.

Figure 8A:
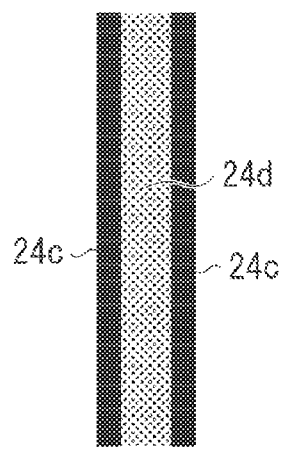
FIGS. 8A to 8C are cross-sectional views illustrating the conductive sheet according to the exemplary embodiment of the present invention.
Figure 8B:
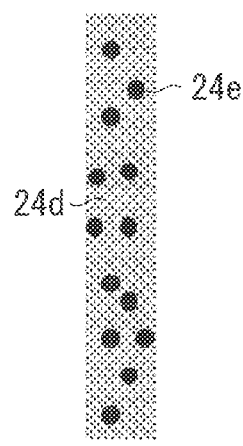
Figure 8C:
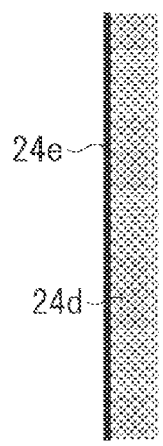

FIGS. 8A to 8C are cross-sectional views illustrating the conductive sheet 24 used in this exemplary embodiment. FIG. 8A illustrates a three-layered conductive sheet 24 sandwiching polystyrene (PS) resin 24d between conductive layers 24c (20 μm to 40 μm) formed by mixing carbon black 24e in the PS resin 24d. FIG. 8B illustrates a one-layer conductive sheet 24 formed by mixing a carbon black 24e into the ethylene-vinyl acetate (EVA) resin 24d. FIG. 8C illustrates a two-layered conductive sheet 24 formed by printing the carbon black 24e on the PS resin 24d. The conductive sheet 24 having an overall thickness of approximately t=0.05 to 0.3 mm is used. As an alternative to the carbon black 24e, for example, the other carbon material such as graphite and carbon fiber can be used. Alternatively, without using the carbon material, the conductive sheet 24 can be formed using a conductive resin. For example, the conductive sheet 24 can be formed by a method of doping with an electron receptor (acceptor) such as iodine and arsenic pentafluoride, or an electron donor (donor) such as alkali metal to provide conductivity.

With respect to the conductive sheet 24, as an alternative to the above-described materials, a material can be used that can fit in the mold 35 by resin pressure of conductive member resin 24d to form the conductive sheet 24, and after the molding, can be fixed to the cover member 122 at a predetermined strength or greater.

The fixation of the conductive sheet 24 to the mold 35 can be made by suction as described above. Alternatively, a retaining pin 36b (FIG. 9A) for fixing the conductive sheet 24 to the mold 35 can be provided, or both of the suction and the retaining pin 36b can be used.

Figure 9A:
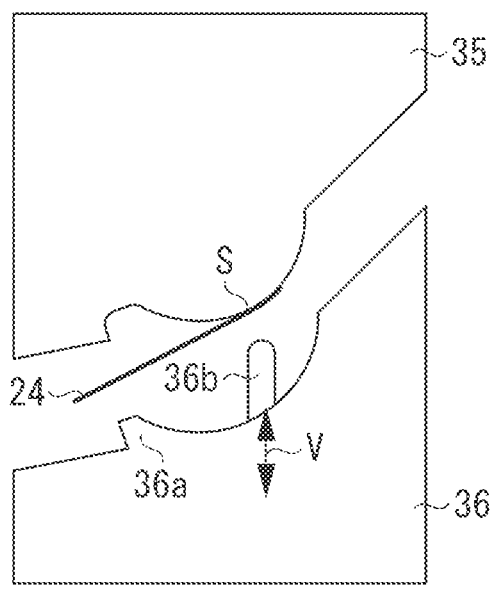
FIGS. 9A to 9E are conceptual views of a mold structure according to the first exemplary embodiment.
Figure 9B:
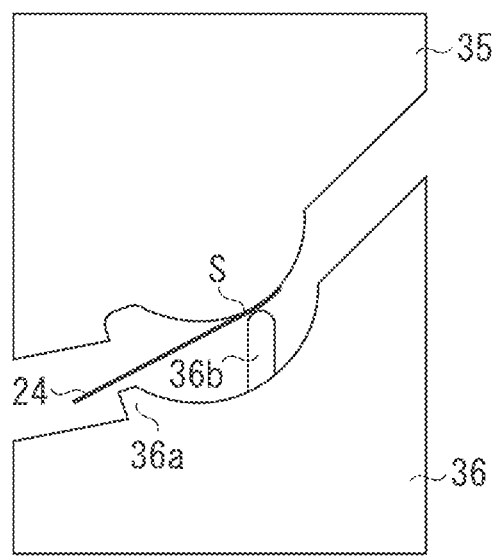

For example, the conductive sheet 24 can be integrated to the cover member 122 using a mold 35 illustrated in FIGS. 9A to 9E. By this method, the retaining pin 36b, which can move in the V direction in FIG. 9A, is added to the mold 35 at the movable side 36. In the process (FIG. 9B) of closing the mold 35, before a portion 36a of the mold 35 of the movable side 36 contacts the conductive sheet 24, the retaining pin 36b that is formed as a protrusion can fix the conductive sheet 24 to the mold 35. That is, the conductive sheet 24 is pressed and deformed by the protrusion, which is the retaining pin 36b in the mold 35, and fixed to the mold of the movable side 36.

Figure 9C:
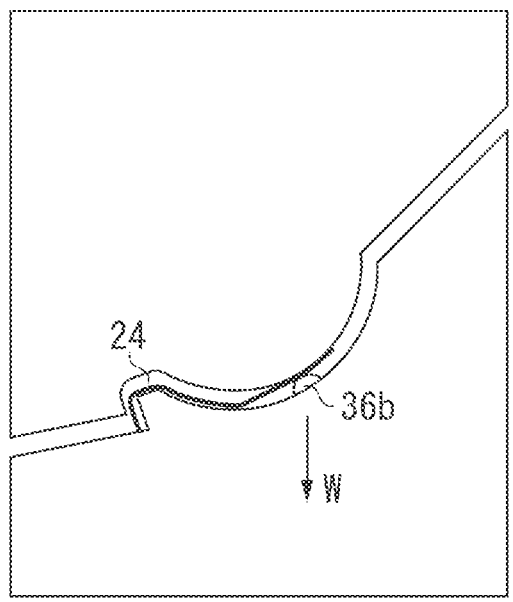
Figure 9D:
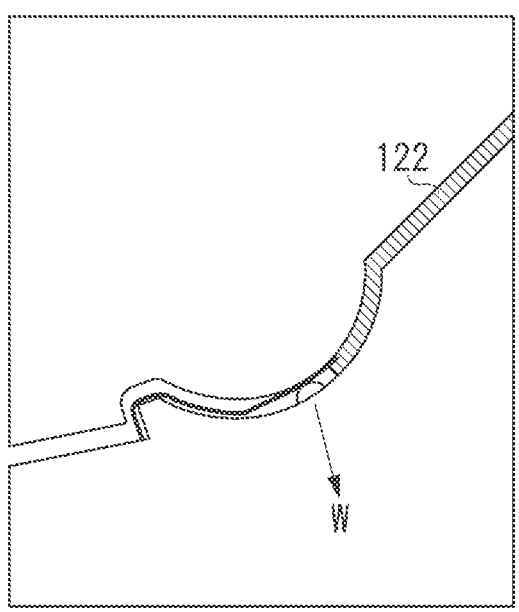
Figure 9E:
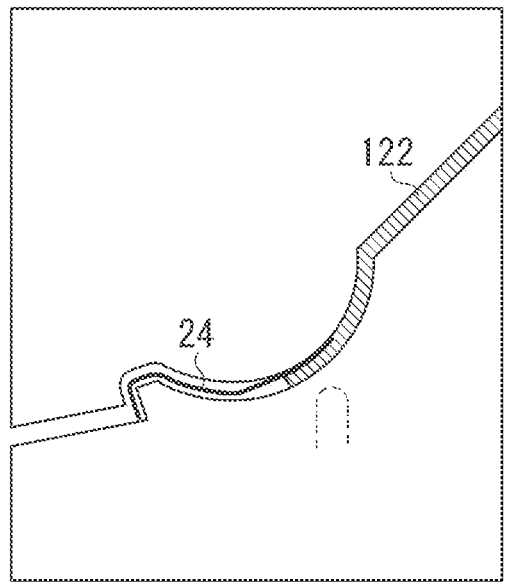

FIG. 9C illustrates a state where the mold 35 is closed in the above-described structure. The retaining pin 36b can be moved in the W direction when it receives the resin pressure of conductive member resin 24d. Such a shape can prevent the cavity of the retaining pin 36b from remaining on the cover member 122 (i.e., the concaved portion does not remain) (FIGS. 9D and 9E).

Figure 10:
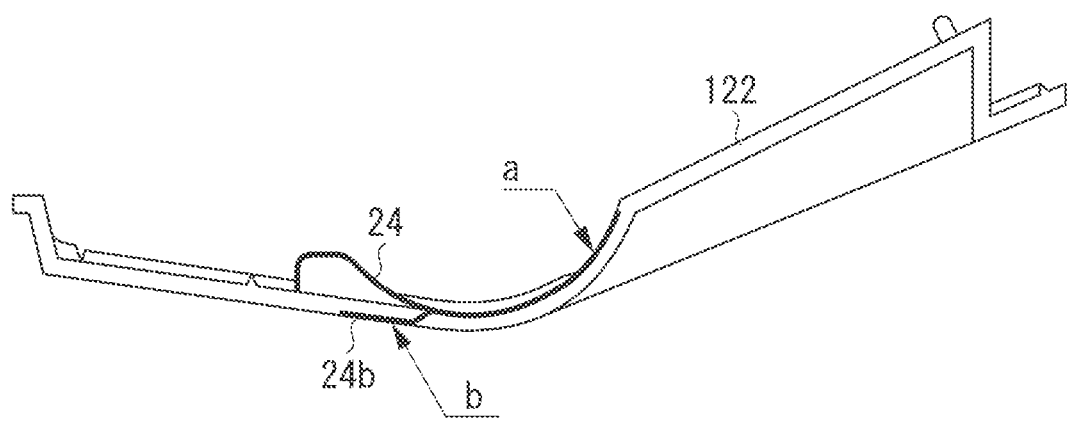
FIG. 10 is a cross-sectional view illustrating the cover member having the conductive sheet according to the exemplary embodiment of the present invention.

With reference to FIGS. 10 and 11, the contact portion 24b of the conductive sheet 24 according to the exemplary embodiment of the present invention is described.

FIG. 10 is a cross-sectional view taken along the line X-X in FIG. 6. As illustrated in the drawing, the contact portion 24b of the conductive sheet 24 is molded to be exposed to a surface 'b' that is the back side of a surface 'a' of the cover member 122. On the surface a, the conductive sheet 24 contacts the toner T. The side contacting the toner T is the side where a space 29 capable of containing the toner T is formed by connecting the cover member 122, which is a first frame member 122, and the toner storage container 23, which is a second frame member 23. That is, the conductive sheet 24 is also formed on a surface opposite to the surface contacting the toner T (developer), that is, on the surface of the other side. At the end portion of the surface contacting the toner T, the conductive sheet 24 has a long and thin portion. A part of the conductive sheet 24 extends in the direction (more specifically, in the perpendicular direction) intersecting with the longitudinal direction of the conductive sheet 24. The joint portion 24f extending in the direction perpendicular to the longitudinal direction of the conductive sheet 24 has a shape extending into the cover member 122 that is the frame member while extending in the intersecting direction. The joint portion 24f of the conductive sheet 24 extending into the inner part of the cover member 122 that is the frame member is connected to the contact portion 24b that is a part of the conductive sheet 24 of the opposite side.

Figure 11A:
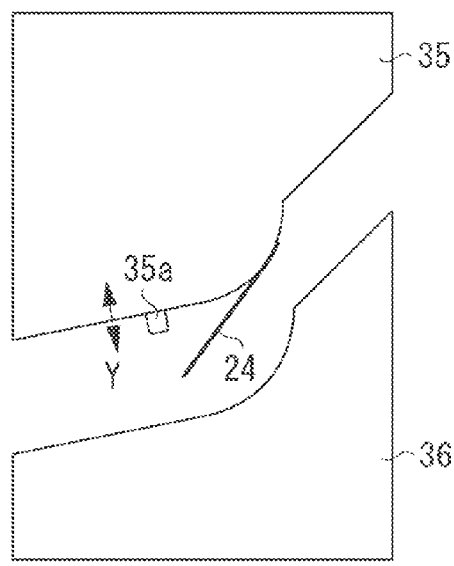
FIGS. 11A to 11C are conceptual views illustrating a mold structure of a conductive sheet contact portion according to the exemplary embodiment of the present invention.
Figure 11B:
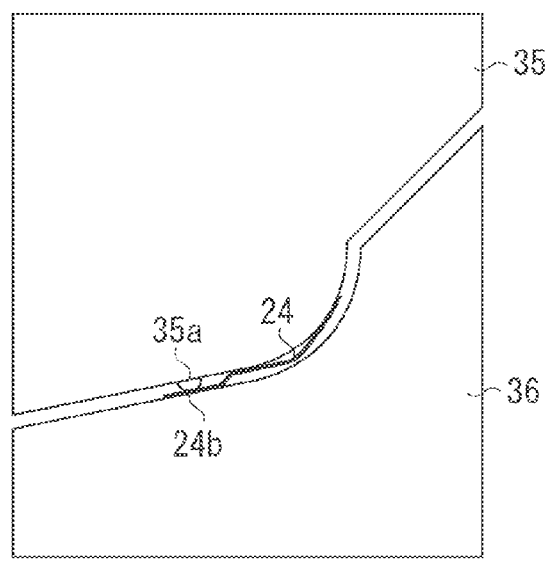
Figure 11C:
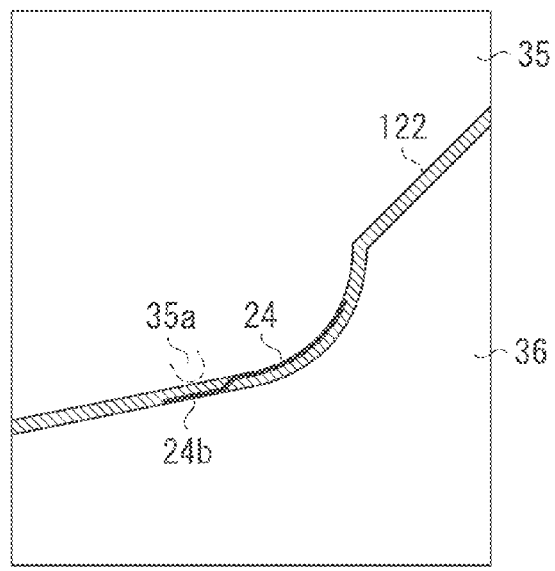

FIGS. 11A to 11C are schematic views illustrating a mold 35 for forming the contact portion 24b of the conductive sheet 24. In this exemplary embodiment, to surely press the contact portion 24b of the conductive sheet 24 against the mold 35 of movable side 36, a retaining pin 35a is provided at the fixed side of the mold 35 (FIG. 11A). The retaining pin 35a is disposed such that the retaining pin 35a can move in the Y direction. When the mold 35 is closed, by a spring force (not illustrated), the contact portion 24b of the conductive sheet 24 is fixed to the mold 35 of the movable side 36 (FIG. 11B). When the molding is closed, a cover member resin 122d is injected (FIG. 11C), and the retaining pin 35a retracts by the resin pressure of resin 122d. With this structure, the contact portion 24b of the conductive sheet 24 can be formed to be exposed to the surface b of the back side. In other words, the contact portion 24b is formed such that, within the frame member, a part 24a of the conductive sheet 24 provided on the first side that contacts the toner T, is connected to a part 24b of the conductive sheet 24 provided at the back side that is a second side. It is preferable that the connecting part within the first frame of the conductive sheet 24 contains a conductive member resin 24d, and more preferably, the part contains a conductive carbon material and a resin 24d. Instead of the carbon material, a conductive resin may also be contained.

A surface area of the contact portion 24b is smaller than the surface area of the conductive sheet portion 24a provided on the first side.

In this exemplary embodiment, as described above, to surely press the contact portion 24b of the conductive sheet 24 against the mold 35 of the movable side 36, the retaining pin 35a having the spring force at the fixed side of the mold 35 is disposed. In another structure, a slide piece portion (not illustrated) can be provided at the fixed side of the mold 35, and the slide piece portion can be moved by a driving unit such as a cylinder. With this structure, the contact portion 24b of the conductive sheet 24 can be surely pressed against the mold 35 of the movable side 36. When the mold 35 is closed, the slide piece portion is pressed against the mold 35 of the movable side 36 through the conductive sheet 24, and the cover member resin 122d is injected. When the cover member resin 122d is injected to a part around the contact portion 24b of the conductive sheet 24, the slide piece portion is retracted from the mold 35 of the movable side 36, and the cover member resin 122d is also injected to the space from which the slide piece portion has retracted. As described above, with the structure the slide piece portion is moved, a mold 35 can also be formed by exposing the contact portion 24b of the conductive sheet 24 to the surface b of the back side.

In the above description, the retaining pin 35a and the slide piece portion is structured such that they retract after the injection of the cover member resin 122d, and the cover member resin 122d is injected into the retracted space. Alternatively, a structure in which the retaining pin 35a and the slide piece portion do not retract can be used. In such a case, the cover member resin 122d is not injected into the portions of the retaining pin 35a and the slide piece portion, which press the conductive sheet 24 against the mold 35 of the movable side 36. However, formation of a space such as a hole in the cover member 122 to which the conductive sheet 24 has been integrated can be prevented by providing the conductive sheet 24 wider than the portion where the conductive sheet 24 is being pressed against the mold 35 of the movable side 36 with the retaining pin 35a and the slide piece portion.

Figure 12:
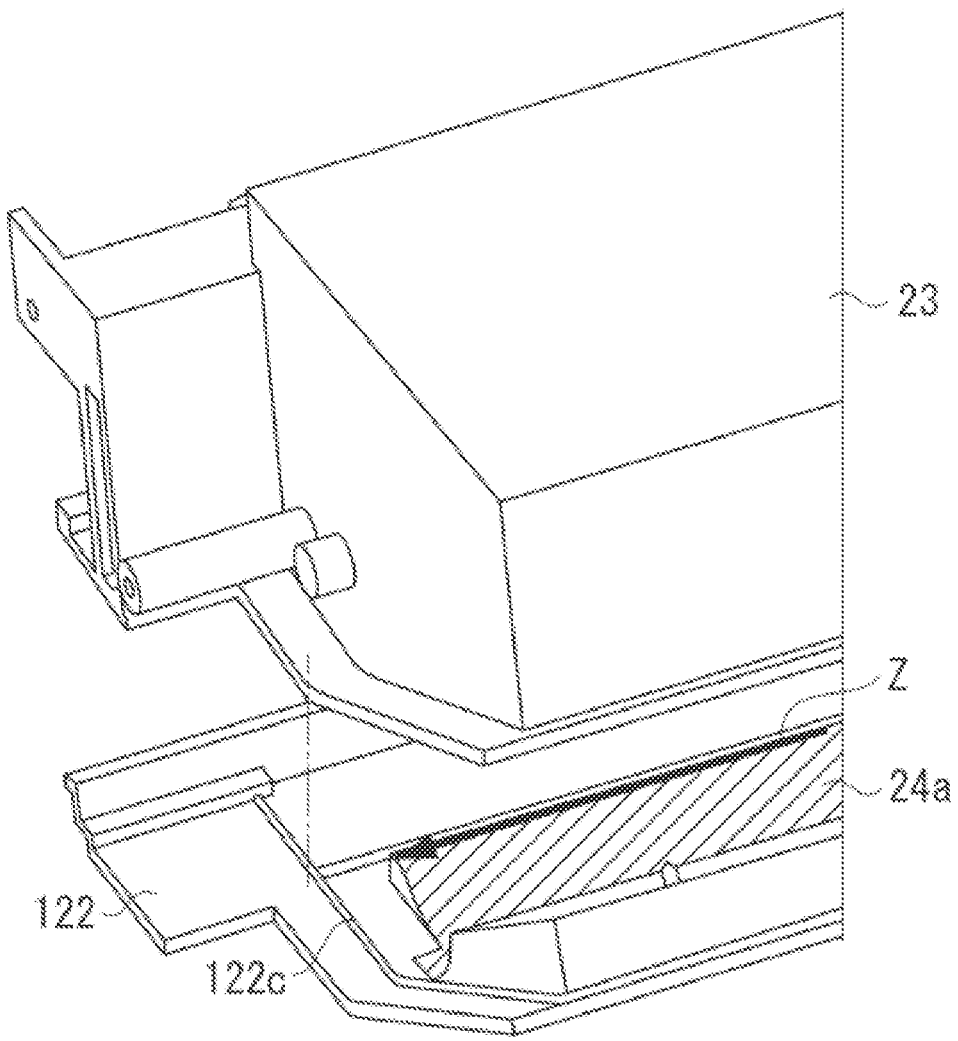
FIG. 12 is a partial perspective view illustrating the coupling of the cover member having the integrally molded conductive sheet, and a toner storage container frame member according to the first exemplary embodiment.
Figure 13:
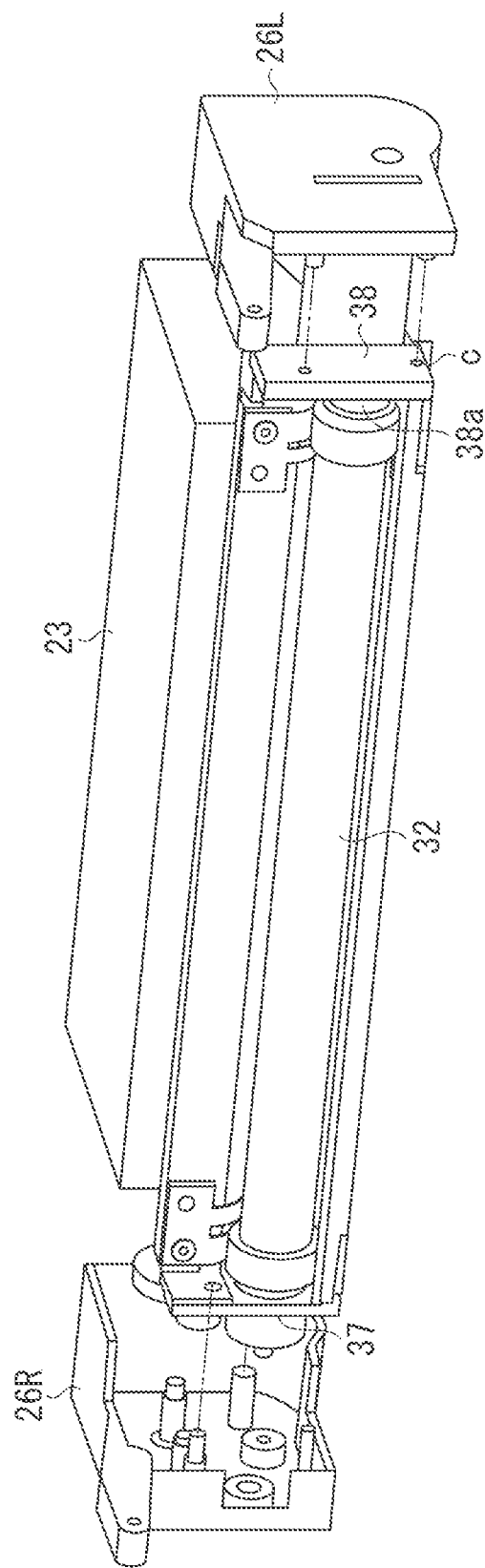
FIG. 13 is a perspective view illustrating a development device to which the exemplary embodiment of the present invention can be applied.

With reference to FIGS. 1, 12, and 13, a remaining toner amount detection system is described.

As described above, the cover member 122 having the integrally formed conductive sheet 24 is fixed to the toner storage container 23 by means of welding, or the like as illustrated in FIG. 12. In this exemplary embodiment, a welding rib 122c is provided in the cover member 122, and ultrasonic vibration is applied to join the cover member 122 and the toner storage container 23 to form the developer container 20.

In this exemplary embodiment, a width Z (FIG. 12) in the longitudinal direction of the remaining toner amount detection portion 24a of the conductive sheet 24 is limited, within the toner storage container 23, to a range in which change in the capacitance generated by change in the remaining toner amount can be detected. The contact portion 24b of the conductive sheet 24 is provided at the non-driven side in the longitudinal direction. If the contact portion 24b is provided at the driven side, between the contact portion 24b and an electrical contact for drive, parasitic capacitance can be generated.

As illustrated in FIG. 13, the development roller that is a developer bearing member 32 having conductivity is disposed to face the conductive sheet 24. The development roller 32, is supported by support bearing members 37 and 38 and rotatably attached to the toner storage container 23 through the side members 26L and 26R.

In this exemplary embodiment, as a material for the development roller 32, hollow aluminum is used, and for the support bearing member 38 on the non-driven side, a conductive resin is used. The inner circumference of the non-driven side of the development roller 32 is supported by the outer circumference 38a of the support bearing member 38.

In response to insertion of the cartridge B into the apparatus body A, a development contact spring (not illustrated) electrically connected to a circuit in the apparatus body A comes in contact with a lower surface 'c' (FIG. 13) of the support bearing member 38 and thereby a bias is applied to the development roller 32.

FIG. 2 is a cross-sectional view illustrating the development device 20 of the cartridge B inserted into the apparatus body A. When the cartridge B is inserted into the apparatus body A, the contact portion 24b of the conductive sheet 24 comes in contact with the remaining toner amount contact 15 (FIG. 1) of the apparatus body A side. The remaining toner amount contact 15 is electrically connected to the remaining toner amount detection unit of the apparatus body A.

Figure 19:
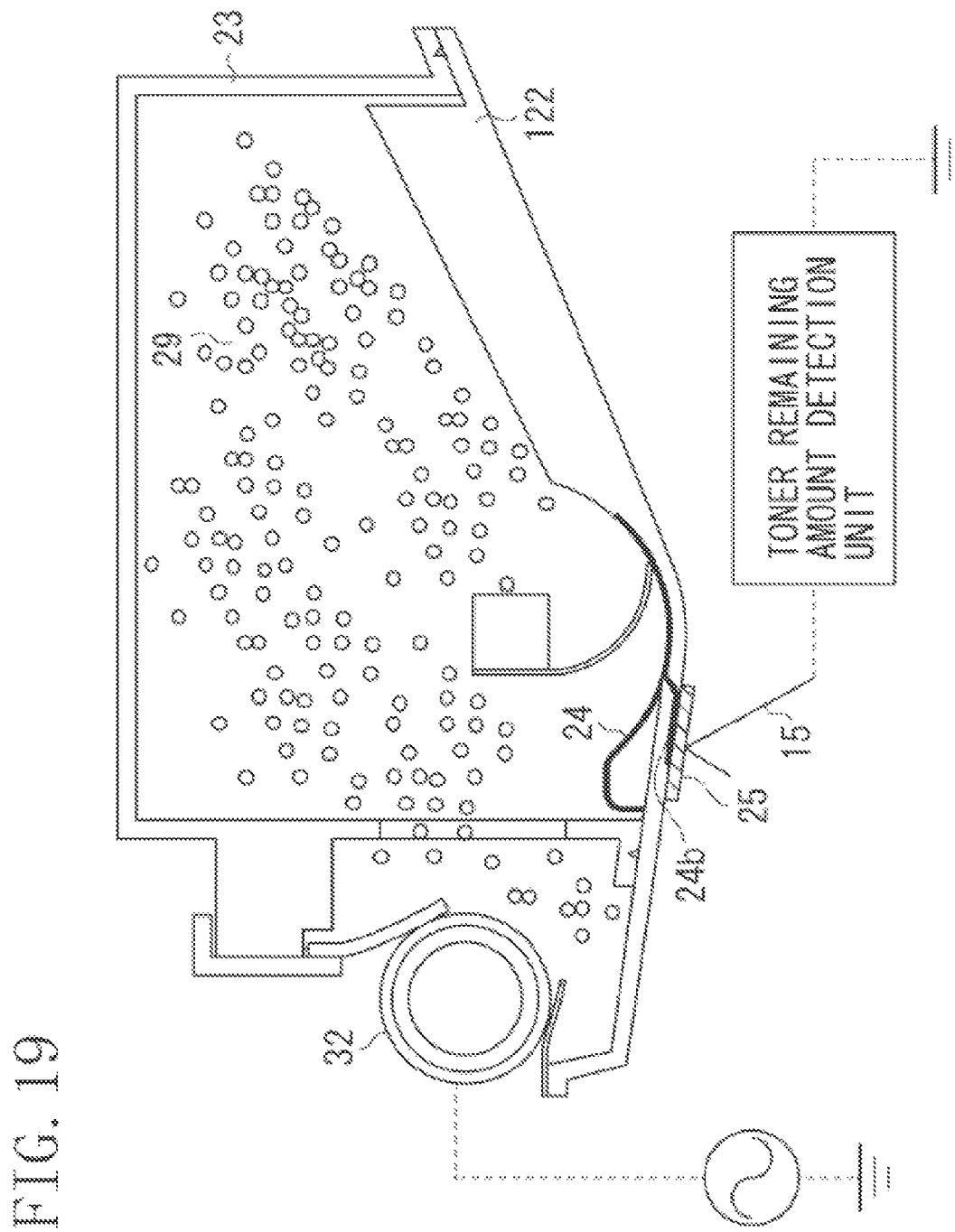
FIG. 19 is a cross-sectional view illustrating a portion around the contact portion of the conductive sheet in a state where the cartridge is inserted into the apparatus body according to the first exemplary embodiment.

In this exemplary embodiment, the contact portion 24b of the conductive sheet 24 is provided abutting on the remaining toner amount contact 15 of the apparatus body A. In another structure, as illustrated in FIG. 19, a contact member 25 can be provided between the contact portion 24b of the conductive sheet 24 and the remaining toner amount contact portion 15 of the apparatus body A. FIG. 19 is a cross-sectional view around the contact portion 24b of the development device 24 having the cartridge B inserted into the apparatus body A. As a material for the contact member 25, a metal material or a conductive resin member can be used. For example, the contact portion 24b of the conductive sheet 24 is inserted into the remaining toner amount contact 15 of the apparatus body A while rubbing against each other. Such a structure prevents the contact portion 24b from being shaved and enables stable electrical connection.

Application of alternating current (AC) voltage to the development roller 32 induces current corresponding to capacitance between the development roller 32 and the conductive sheet 24. The capacitance changes depending on an amount of the toner T between the development roller 32 and the conductive sheet 24. Consequently, through the remaining toner amount contact 15 of the apparatus body A side, the induced current value is measured by the remaining toner amount detection unit, and thereby the remaining toner amount T between the development roller 32 and the conductive sheet 24 can be sequentially detected.

Figure 18A:
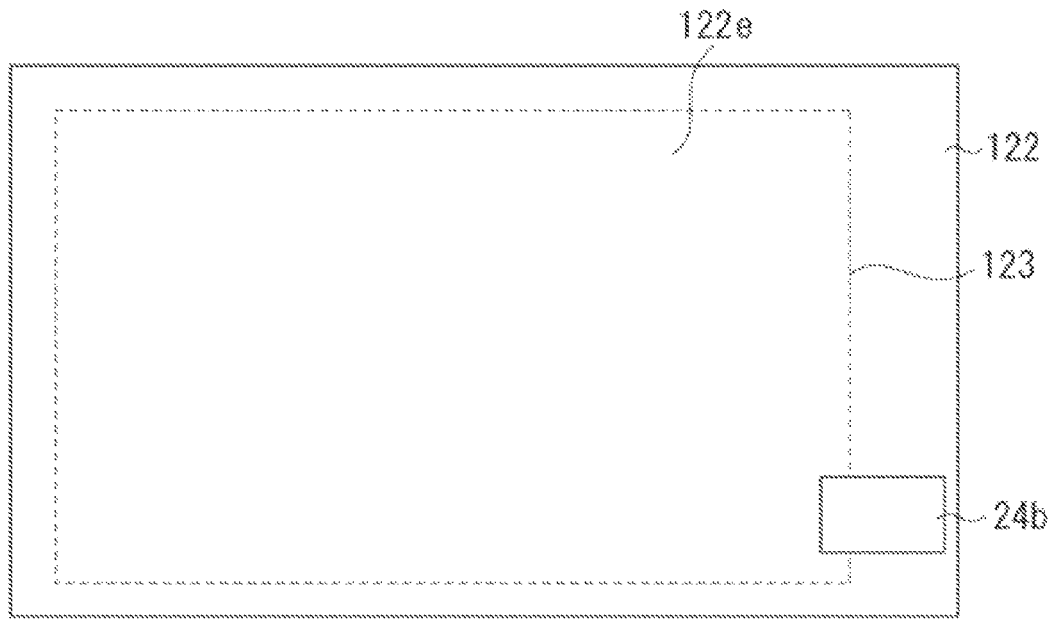
FIGS. 18A and 18B illustrate a layout of the contact portion of the conductive sheet according to the first exemplary embodiment.
Figure 18B:
Figure 21A:
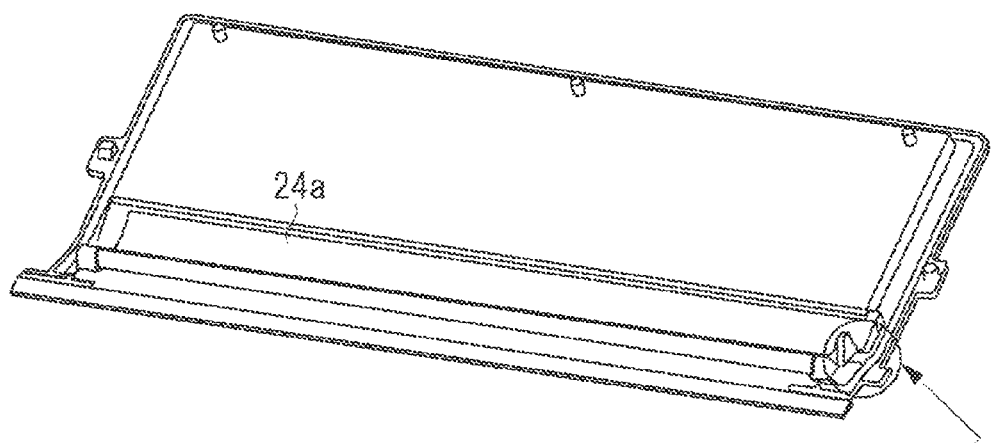
FIGS. 21A and 21B illustrate a layout of the contact portion of the conductive sheet according to the first exemplary embodiment.
Figure 21B:
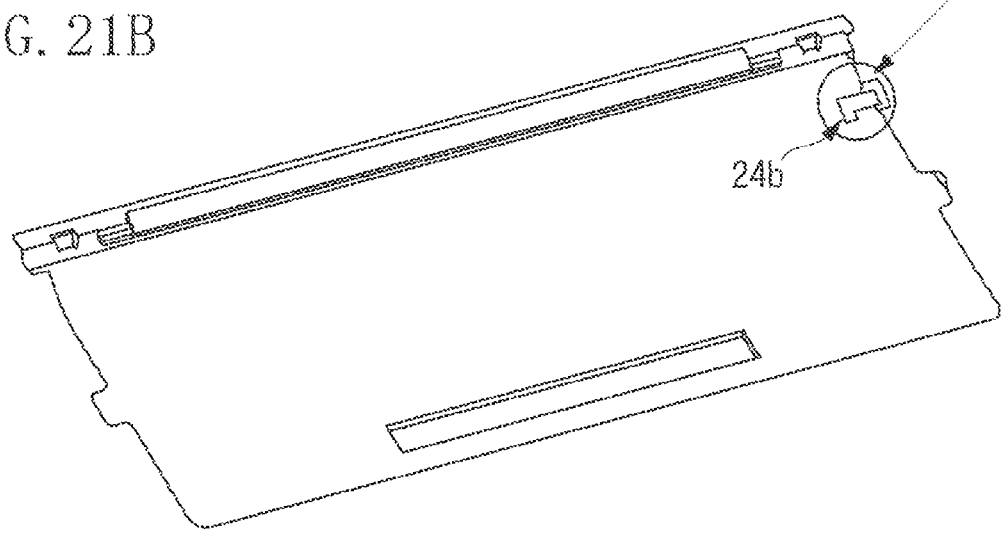

As described above, in this exemplary embodiment, the remaining toner amount detection portion 24a of the conductive sheet 24 is formed to have only a width necessary for the remaining toner amount detection in the toner storage container 23. Further, in the outward toner storage container 23, the contact portion 24b is exposed to the back side of the side contacting the toner T. For example, the contact portion 24b can be provided as illustrated in FIGS. 18A and 18B. FIGS. 18A and 18B are views from the back surface side, and in the drawings, the dotted lines indicate a portion where the first frame member 122 and the second frame member 23 are connected with a welding rib 122c and a portion sealed through the development roller 32. The developer is stored inside the connected portions 123. The contact portion 24b is disposed, as illustrated in FIG. 18B, outside of an area 122e surrounded by the connection portion formed by connecting the first frame member 122 and the second frame member 23. As illustrated in FIG. 18A, a part of the contact portion 24b can be formed in the area. The contact portion 24b is provided at the end portion side in the longitudinal direction of the cover member 122 in the vicinity of the developer bearing member 32. Similarly, FIGS. 21A and 21B illustrate the contact portion 24b provided in the area surrounded by the connection portion, which extends to the outside of the area. FIG. 21A illustrates the remaining toner amount detection portion 24a for storing the developer, and detecting a remaining amount using capacitance of the conductive sheet 24. FIG. 21B illustrates the back side of the frame member including the contact portion 24b of the conductive sheet 24. As will be understood from FIGS. 21A and 21B, the elongated end portion of the conductive sheet 24 extends to wrap around the stirring member 43 supporting portion for supporting the stirring member 43, extending in the frame member while extending in the direction intersecting with the longitudinal direction of the conductive sheet 24, and the conductive sheet 24 appears as the contact portion 24b on the surface of the opposite side. The contact portion 24b of the conductive sheet 24 extends in the same direction as the longitudinal direction of the conductive sheet 24.

With such an arrangement, the remaining toner amount contact 15 of the body side of the apparatus body A can be disposed at a further inner side in the longitudinal direction as compared to the toner storage portion 29 of the toner storage container 23. This contributes to reduction of the size of the apparatus body A.

(The Developer Container 20)

In this exemplary embodiment, the developer container 20 used in the development device has been mainly described. Alternatively, a developer container 20 can be formed by the first frame member 122 and the second frame member 23. In the developer container 20, the development roller 32 serving as a developer bearing member 32 can be omitted, and it is conceivable that the developer container is used, for example, as a cartridge B for refill. Consequently, although the developer bearing member 32 is used as the counter electrode of the conductive sheet 24 in this exemplary embodiment, if the developer bearing member is not provided, another electrode for detecting capacitance is to be provided. To detect the capacitance generated between the conductive sheet 24 and the electrode, in the case of the cartridge B for refill, the conductive sheet 24 and the electrode are to be provided near the opening through which the developer moves toward the refill destination.

Hereinafter, with reference to FIGS. 14 to 17, the second exemplary embodiment of the present invention is described.

Figure 14:
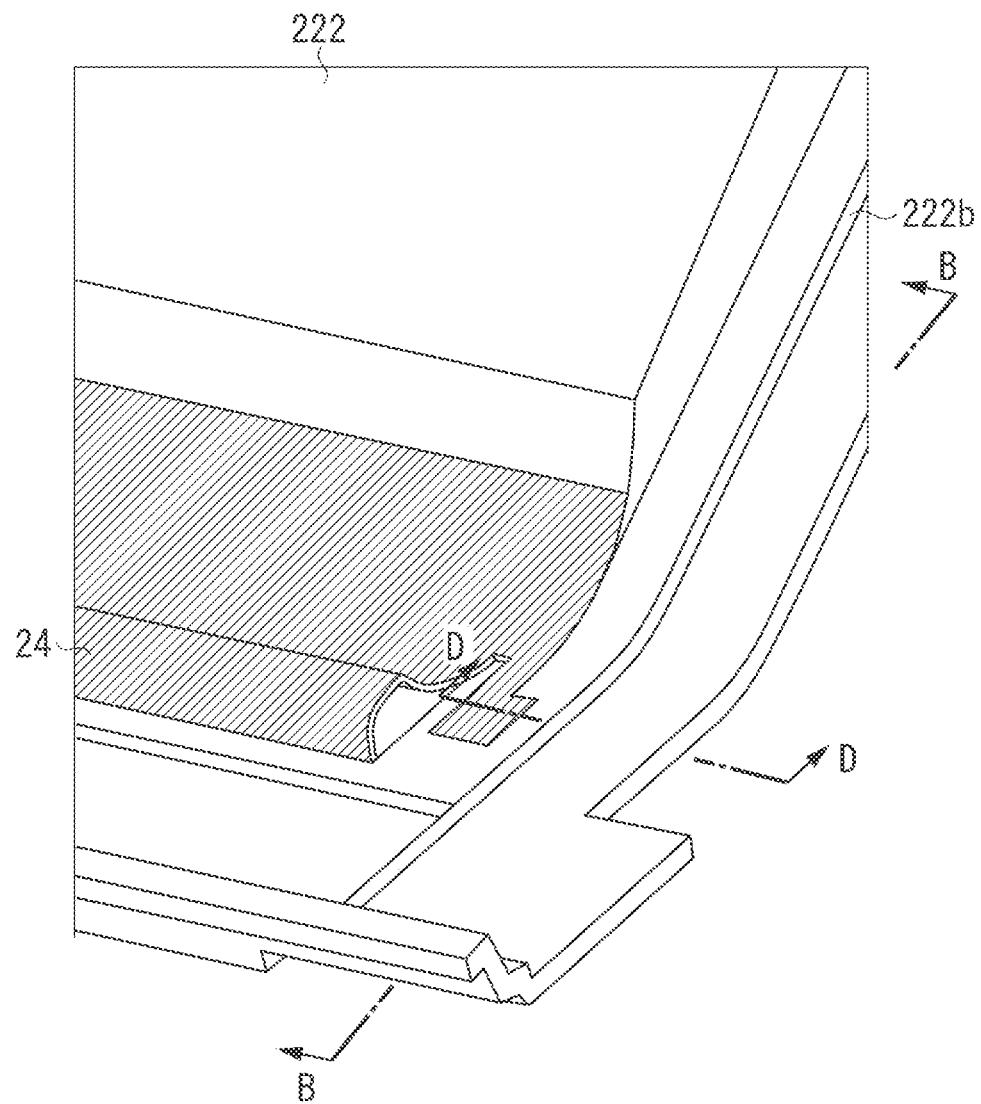
FIG. 14 is a partial perspective view illustrating a cover member having a conductive sheet according to the second exemplary embodiment.
Figure 15:
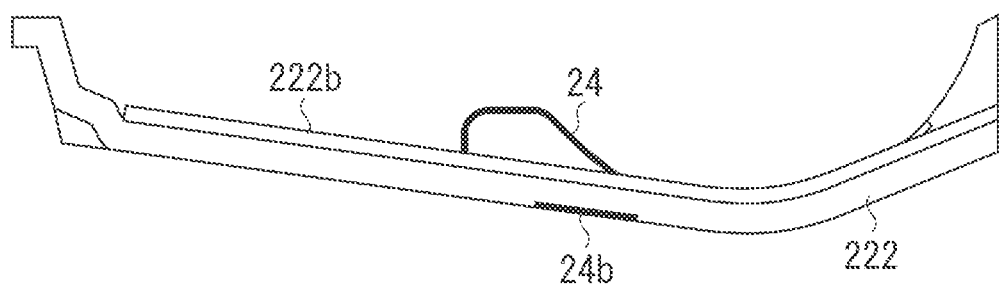
FIG. 15 is a partial cross-sectional view illustrating the cover member having the conductive sheet according to the second exemplary embodiment.
Figure 16A:
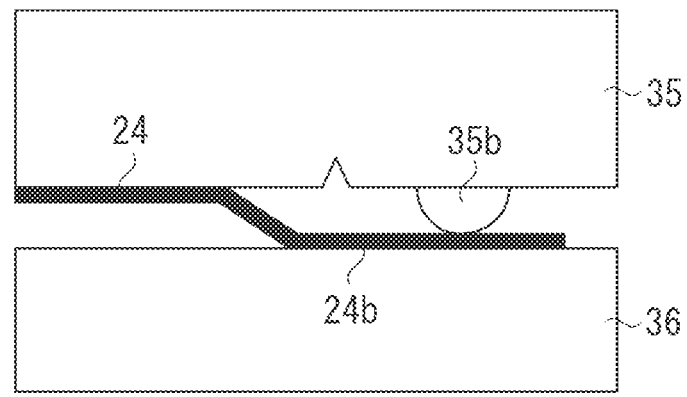
FIGS. 16A and 16B are schematic views illustrating a structure of a contact portion of the conductive sheet according to the second exemplary embodiment.
Figure 16B:
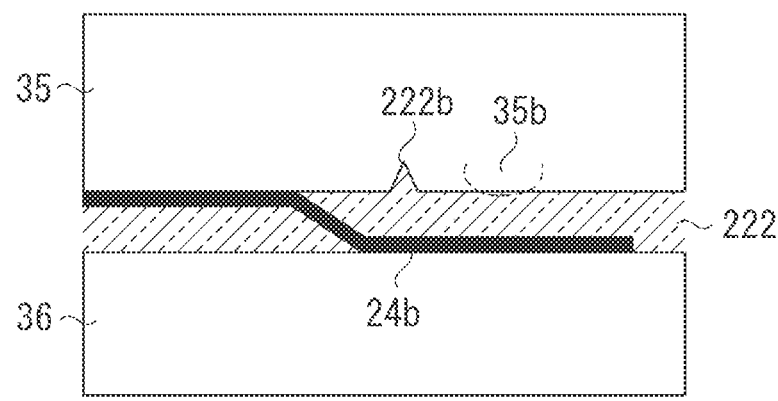
Figure 17:
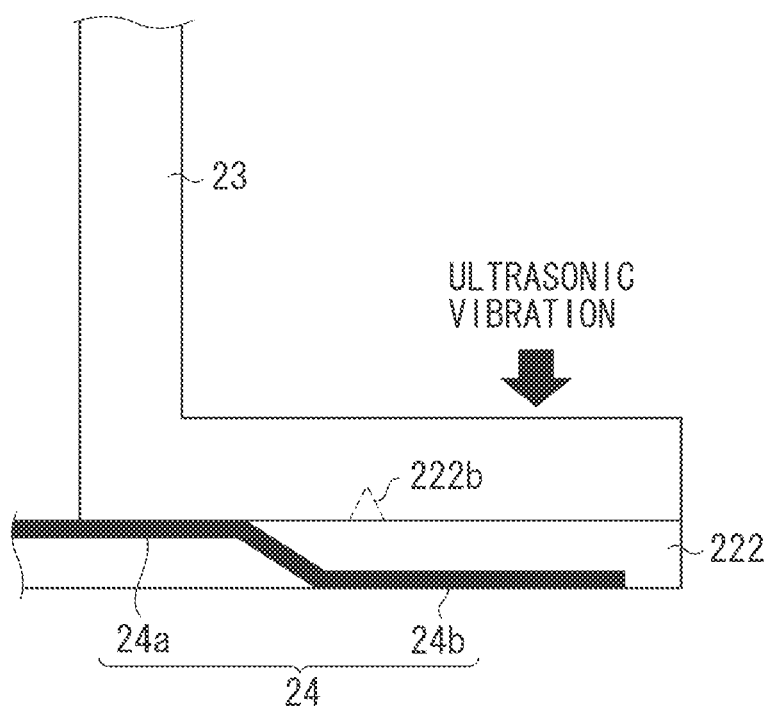
FIG. 17 is a cross-sectional view illustrating the cover member having the conductive sheet, and further having a toner storage container welded to the cover member.

FIG. 14 is a partial perspective view illustrating a cover member 222 having the integrally formed conductive sheet 24 according to the exemplary embodiment. FIG. 15 is a partial cross-sectional view taken along the line B-B in FIG. 14. FIGS. 16A and 16B are schematic cross-sectional views illustrating a mold 35 taken along the line D-D in FIG. 14. FIG. 17 is a cross-sectional view taken along the line D-D in FIG. 14, the view illustrating a state where the conductive sheet 24 is integrally formed to the cover member 222, and the toner storage container 23 is welded according to the exemplary embodiment.

In this exemplary embodiment, as illustrated in FIGS. 14 to 17, the contact portion 24b of the conductive sheet 24 is provided in the outside of a welding rib 222b of the cover member 222 to expose to the back of the side contacting the toner T. The integral molding of the remaining toner amount detection portion 24a of the conductive sheet 24 to the cover member 222 is similar to that in the first exemplary embodiment.

With respect to the mold 35 for forming the contact portion 24b of the conductive sheet 24 according to the exemplary embodiment, as illustrated in FIG. 16A, a retaining pin 35b that can retract is provided in the mold 35 of the fixed side. When the mold 35 is closed, by a spring force (not illustrated) provided in the retaining pin 35b, the contact portion 24b of the conductive sheet 24 is fixed to the mold 35 of the movable side 36. When a cover member resin, to form cover member 222, is injected (FIG. 16B), the retaining pin 35b retracts by the resin pressure of the resin, and the molding is completed.

Similarly to the first exemplary embodiment, with respect to the mold-processed cover member 222, ultrasonic vibration is applied to the welding rib 222b to connect with the toner storage container 23. According to the exemplary embodiment, in the area outside the welding rib 222b, the conductive sheet 24 is disposed on the back side of the surface to be welded (the side contacting the toner T in the cover member 122) to the toner storage container 23. Consequently, in the welding, the tearing of the conductive sheet 24 or increase in the electric resistance can be reduced.

In other words, in view of the component layout in the apparatus body A, even if the remaining toner amount contact 15 of the apparatus body A side is to be disposed outside of the toner storage portion 29, with the simple structure, both of the reliability of the contact and the toner T sealing from the development device can be achieved.

In this exemplary embodiment, as the conductive sheet 24, the conductive sheet 24 having conductivity at both sides of the conductive sheet 24 as shown in FIG. 8A, and the single-layer conductive sheet 24 as shown in FIG. 8B are employed. In addition, even if the conductive sheet 24 has the conductive layer only on one side as shown in FIG. 8C, as long as it achieves the remaining toner amount detection performance with its resistance value and the thickness, the conductive layer can be used by integrally molding to the cover member 122 at the side contacting the remaining toner amount contact 15 on the body side.

As described in the exemplary embodiment, at a position inside the toner storage container 23 in the longitudinal direction, the conductive sheet 24 is integrally molded to be exposed to the back side of the cover member 122 which the toner T contacts. This structure can reduce the space of the image forming apparatus.

Further, at a position outside of the welding rib 122c (FIG. 12) of the cover member 122, the conductive sheet 24 is integrally molded to the cover member 122 to be exposed on the back side of the cover member 122 which the toner T contacts. Accordingly, with the simple structure, both sealing of the toner T from the development device and the reliability of the contact portion 24b can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-146569 filed Jul. 12, 2013, and No. 2014-125611 filed Jun. 18, 2014 which are hereby incorporated by reference herein in their entirety.

What is claimed is:

1. A developer container comprising:
    a conductive resin member having resin and configured to detect a developer amount by using capacitance; and
    a frame member configured to store developer,
    wherein the conductive resin member includes (i) a conductive resin detection portion configured to detect the developer amount in a first side of the frame member which contacts the developer, (ii) a conductive resin contact portion in a second side of the frame member that is different from the first side, and (iii) a conductive resin joint portion connected with the detection portion and the contact portion within the frame member, and
    wherein the resin in the detection portion, the contact portion and the joint portion is the same resin.

2. The developer container according to claim 1, wherein a surface area of the contact portion is smaller than a surface area of the detection portion.

3. The developer container according to claim 1, wherein the frame member includes a convex portion, and the detection portion is formed covering the convex portion.

4. The developer container according to claim 3, wherein the convex portion is provided in the first side, and the convex portion extends in a longitudinal direction of the detection portion.

5. The developer container according to claim 1, wherein the frame member includes a first frame member having the conductive resin member and a second frame member, and
    wherein the first frame member and the second frame member are connected to each other to form a space for storing the developer.

6. The developer container according to claim 5, wherein the contact portion is provided outside a surrounded area surrounded by a connected portion formed by the first frame member and the second frame member connected with each other.

7. The developer container according to claim 1, wherein the conductive resin member and the first frame member are integrally molded.

8. The developer container according to claim 3, wherein the joint portion is extended to an inside of the frame member in a direction intersecting with a longitudinal direction of the convex portion provided in the first side, and the joint portion connects with the contact portion provided in the second side.

9. The developer container according to claim 1, wherein the detection portion is formed on a bent portion or a curved surface.

10. The developer container according to claim 1, wherein the frame member is molded by injection molding such that the joint portion is located within the frame member.

11. The developer container according to claim 1, wherein the developer container includes an electrode configured to cooperate with the conductive resin member to detect change in capacitance generated by change in a remaining toner amount.

12. A developing apparatus comprising the developer container according to claim 11,
    wherein the electrode is a developer bearing member configured to carry the developer.

13. A process cartridge comprising:
the developer container according to claim 1; and
an image bearing member configured to carry a developer image.

14. An image forming apparatus comprising:
the developer container according to claim 1; and
an apparatus body contact portion configured to connect with the contact portion,
wherein the image forming apparatus forms an image on a recording medium using the developer.

15. The developer container according to claim 1, wherein the joint portion includes two opposing flat surfaces.

16. The developer container according to claim 1, wherein the detection portion, the joint portion, and the contact portion are a single piece construction so as to be included in the conductive resin member.

17. The developer container according to claim 1, wherein the detection portion, the joint portion, and the contact portion each include conductive resin.

18. The developer container according to claim 1, wherein the conductive resin member is formed by mixing conductive particle and resin.

19. A developer container comprising:
a frame member configured to store developer and having a first side and a second side that is a backside of the first side of the frame member; and
a conductive member including resin, wherein the conductive member is configured to detect a developer amount by using capacitance,
wherein a conductive resin first portion of the conductive member is provided along the first side of the frame member to be in contact with the developer and a conductive resin second portion of the conductive member is provided along the second side of the frame member,
wherein a conductive resin joint portion of the conductive member is provided to connect the first portion and the second portion to each other through the frame member, and
wherein the resin in the first portion, the second portion and the joint portion is the same resin.

20. The developer container according to claim 19, wherein the first portion is a detection portion configured to detect the developer amount and
the second portion is a contact portion configured to abut on a remaining toner amount contact of an apparatus body of an image forming apparatus.

21. The developer container according to claim 20, wherein a surface area of the contact portion is smaller than a surface area of the first portion of the conductive member.

22. The developer container according to claim 19, wherein the frame member includes a convex portion, and the first portion of the conductive member covers the convex portion of the frame member.

23. The developer container according to claim 22, wherein the convex portion is provided along the first side of the frame member and extends in a longitudinal direction of the first portion of the conductive member.

24. The developer container according to claim 19, wherein the frame member includes a first frame member having the conductive member, and a second frame member that forms a space by connecting with the first frame member, wherein the space is storage portion configured to storing the developer.

25. The developer container according to claim 24, wherein the second portion of the conductive member is provided inside a surrounded area surrounded by a connected portion formed by the first frame member and the second frame member connected with each other.

26. The developer container according to claim 24, wherein the conductive member and the first frame member are integrally molded.

27. The developer container according to claim 19, wherein the joint portion is extended to an inside of the frame member in a direction intersecting with a longitudinal direction of the first portion provided along the first side, and the joint portion connects with the second portion provided along the second side.

28. A process cartridge comprising:
the developer container according to claim 19; and
an image bearing member configured to carry a developer image formed by the developer stored in the frame member of the developer container.

29. An image forming apparatus comprising the developer container according to claim 19,
wherein the image forming apparatus is configured to form an image on a recording medium using the developer stored in the frame member of the developer container.

30. A method for manufacturing the developer container according to claim 19, the method comprising:
holding the conductive member within a mold configured to form the frame member;
deforming the conductive member such that a first part of the conductive member is disposed on the first side of the frame member and a second part of the conductive member is disposed on the second side of the frame member; and
injecting the resin into the mold to form the frame member.

31. A method for manufacturing the developer container according to claim 30, wherein deforming the conductive member includes pressing the conductive member with a protrusion within the mold.

32. The developer container according to claim 19, wherein the conductive member is formed by mixing conductive particle and resin.

33. A developing apparatus comprising:
a developer bearing member configured to carry-a developer;
a conveyance member configured to convey the developer toward the developer bearing member according to a rotation of a rotation shaft;
a conductive resin member having resin and configured to detect a developer amount by using an electrostatic capacity between the conductive resin member and the developer bearing member;
a frame member configured to store the developer; and
a convex portion provided on a first side of the frame member and positioned between the developer bearing member and the rotation shaft of the conveyance member in a horizontal direction when seeing along a direction of an axis of the rotation shaft,
wherein the conductive resin member includes:
a detection portion configured to detect the developer amount and provided on the first side of the frame member where the detection portion contacts the developer,
an electrical contact portion provided on a second side of the frame member that is different from the first side, and
a relay portion configured to relay the detection portion and the electrical contact portion inside the frame member, wherein the convex portion is covered with the detection portion.

34. The developing apparatus according to claim 33, wherein the conductive resin member is formed by mixing conductive particle and resin.

35. The developing apparatus according to claim 33, wherein the resin in the detection portion, the electrical contact portion, and the relay portion is the same resin.

36. The developing apparatus according to claim 33, wherein the convex portion includes: (i) a peak portion, (ii) a first side portion which is lower than the peak portion in a direction of gravity in an attitude at time of use and arranged at the side the developer bearing member exists, and (iii) a second side portion which is lower than the peak portion in the direction of gravity in the attitude at time of use and arranged at the side the conveyance member exists, and wherein the first side portion is covered with the detection portion.

* * * * *